UNITED STATES PATENT OFFICE.

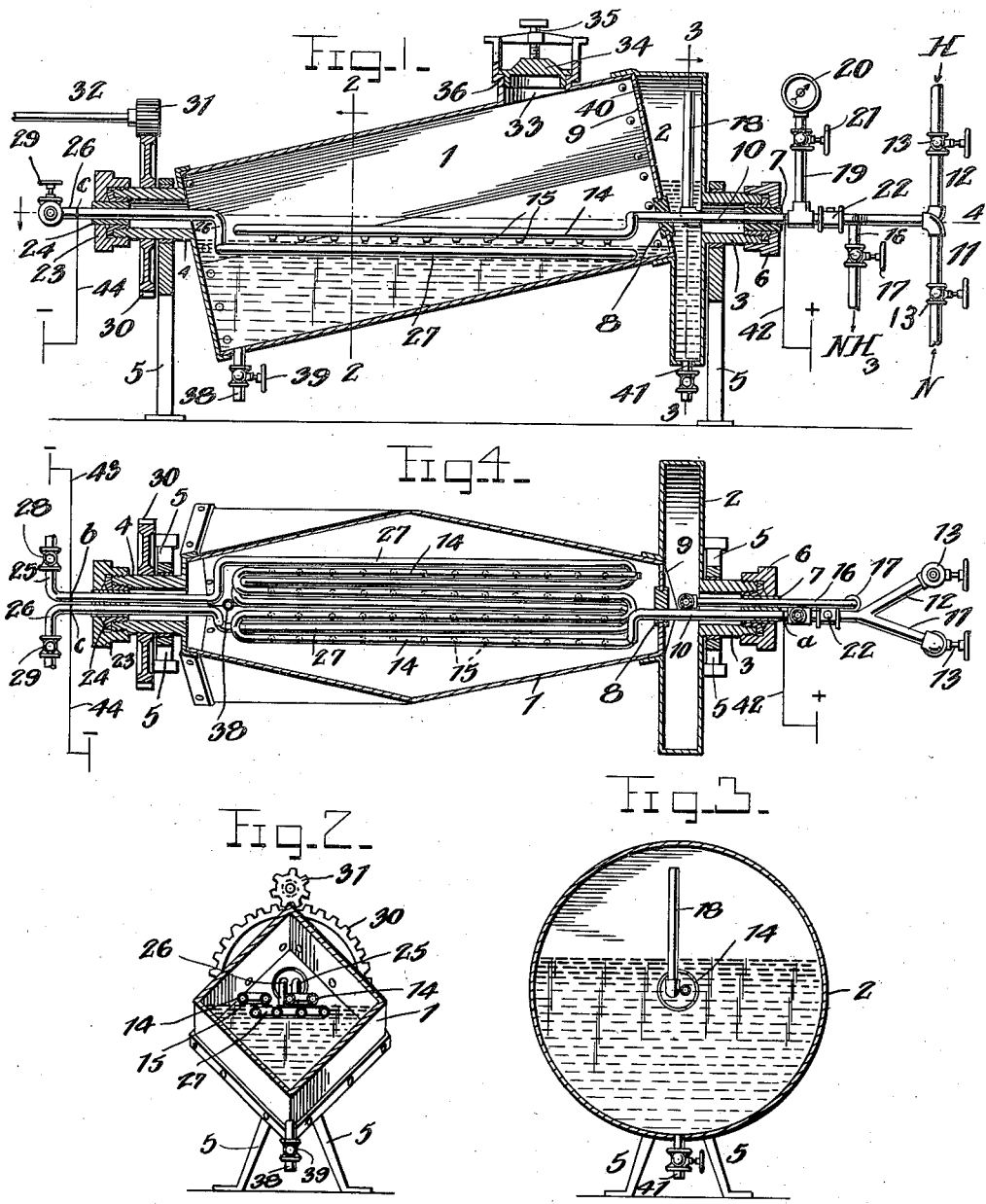

HENRY SPENCER BLACKMORE, OF MOUNT VERNON, NEW YORK, ASSIGNOR TO ROBERT E. ROBINSON AND DANIEL C. SPRUANCE, TRUSTEES, OF NEW YORK, N. Y.

PROCESS OF MAKING AMMONIA OR OTHER NITROGEN-HYDROGEN BINARY COMPOUNDS.

974,741.      Specification of Letters Patent.      Patented Nov. 1, 1910.

Original application filed November 23, 1908, Serial No. 463,980. Divided and this application filed March 25, 1909. Serial No. 485,829.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Making Ammonia or other Nitrogen-Hydrogen Binary Compounds, of which the following is a specification.

The object of this invention is to produce ammonia or other binary compounds of hydrogen and nitrogen and consists in uniting or combining nitrogen with hydrogen, or substances containing the same, in a yielding state, by the action of a form of energy by friction, attrition, or agitation of, or with, substances, such as mercury, communicating therewith and preferably a substance like mercury capable of amalgamating with ammonium, thereby augmenting the process of combination by its natural affinity for ammonium and facilitating the union of nitrogen with hydrogen, or substances containing the same, by its contact action therewith, and further facilitating the union by assimilating or associating the mercury with calcium, palladium, etc., or similar metal having a natural affinity for hydrogen, thereby acting as an intermediary or carrier of hydrogen to the energized nitrogen, being a division of an application filed Nov. 23, 1908, Serial No. 463,980.

In carrying out my invention for the production of ammonia I provide a receptacle containing mercury and subject it to rapid agitation by shaking or otherwise moving the same, or the mercury therein, and then introducing into or through the agitated mercury nitrogen and hydrogen, whereby the nitrogen is caused to combine or unite with the hydrogen in the presence of the mercury forming the ammonia ($NH_3$), some of which, together with a portion of the hydrogen, unites with the mercury producing ammonium amalgam, which may be finally recovered as ammonia by heating the amalgam so formed. By introducing the nitrogen and hydrogen in a heated condition, either individually or collectively, the formation of ammonia is facilitated and the formation of ammonium amalgam is largely prevented, or by heating the mercury before or during the passage therethrough of the nitrogen and hydrogen, this result is also attained.

It can be seen that the formation of ammonia from nitrogen and hydrogen can be continuously performed by passing a current of nitrogen and hydrogen through the agitated mercury, preferably heated, and the ammonia thus formed, collected or recovered by passing the resultant gaseous product into or through an absorbent agent, such as water, or preferably acidulated water, such as dilute sulfuric or hydrochloric acid, in which case ammonium sulfate or chlorid is produced, or it may be secured in any other convenient manner.

Instead of passing the nitrogen and hydrogen through agitated mercury, I can atomize the mercury with a blast of compressed nitrogen and hydrogen or cause the substances to be rapidly associated or agitated in any convenient manner.

I find it of advantage to employ mercury containing calcium, the latter of which assists or facilitates the union of nitrogen and hydrogen by absorbing the hydrogen at ordinary temperatures, transiently forming intermediately, so-called, calcium hydrid, which is broken up into ammonia by action of the nitrogen, which with hydrogen forming ammonium amalgam. Particles of metallic calcium, or so-called calcium hydrid, may be employed instead of or without mercury, but find the presence of mercury greatly advantageous, as it facilitates the action of the calcium or similar contact substance at ordinary temperatures and also prevents the action of calcium on the lining or walls of the container, especially if it be of glass or enamel. Exposing nitrogen and hydrogen to the action of agitated combining agents while under pressure also increases the yield of ammonia and is a preferred way of introducing the gases.

Many other substances than mercury may be employed to induce the combination of nitrogen and hydrogen by agitation, attrition, or friction, such as sharp sand or silica, in which case it is preferable to heat the nitrogen and hydrogen and produce a sand blast by action of said heated gases under pressure; upon the subsidence of said hot blast, the gases to a large degree will be found to have combined, forming ammonia, which can be absorbed, collected, or recovered in any convenient manner. I find it, however, of advantage to employ contact, agitating or frictional substances which have a natural affinity for ammonium at low temperature and from which it can be readily liberated by simply elevating the temperature, such as mercury, or mercury and calcium.

In employing mercury or amalgams as agitating or combining agents, it is found that by passing a current of electricity through the metal during agitation with the nitrogen and hydrogen, that union and formation of ammonia is further facilitated by the numerous electric sparks produced by the rapid completing and breaking of the electric current circuit throughout the mass during agitation, which means is preferably employed for the additional feature of heating the mercury for liberating any ammonia which may, with hydrogen, have formed an amalgam during the progress of the process. Instead of agitating the mercury or other combining agent mechanically, it can be agitated by forcing a rapid stream of nitrogen and hydrogen, or other fluid or solid, through or in contact with the same.

In the accompanying drawings, I have illustrated an apparatus especially adapted for carrying out my new and improved process, and in which:

Figure 1, is approximately a vertical, longitudinal section; Fig. 2, a transverse section on line 2—2 of Fig. 1; Fig. 3, a similar section on line 3—3 of Fig. 1, and Fig. 4, a horizontal, longitudinal section on line 4—4 of Fig. 1.

Referring to the several views, the numeral 1 indicates a rotatable rectangular vessel or receptacle, having one of its ends provided with a circular chamber 2, the axial center of which is at one of the corners of said vessel, where it is provided with a hollow journal arm 3, communicating with said chamber, and the other end of the vessel is provided, at the corner diagonally opposite the arm 3, with a similar journal arm 4, in communication with said vessel, the vessel being journaled in suitable standards or supports 5, 5. The outer end of the journal arm 3 is closed by a stuffing-box 6, and passing through an insulating section 7, in said stuffing-box and a similar section 8, in the partition 9, between the vessel and the chamber 2, is an inlet-pipe 10, terminating at its outer end in branches 11 and 12, each branch being provided with a regulating valve 13, the inner end of the inlet-pipe 10, within the vessel, terminates in a coil 14, closed at the end and provided with a plurality of small perforated projections 15, the purpose of which will be hereinafter explained. Also passing through the stuffing-box 3, is a discharge-pipe 16, having its outer end provided with a valve 17, and its inner end terminating in a vertical extension 18, within the chamber 2. The inlet-pipe is provided with a pipe 19, carrying a pressure gage 30, to indicate the pressure, said pipe 19 being provided with a valve 21, and the inlet-pipe is provided with a check-valve 22, to prevent back pressure.

The outer end of the journal-arm 4, is closed by a stuffing-box 23, and passing through an insulating section 24, in said stuffing-box are inlet and outlet-pipes 25 and 26, respectively, of a heating or cooling coil 27, situated within the vessel. The inlet-pipe 27, is provided with a valve 28, and the outlet-pipe with a valve 29. The journal-arm 4, is provided with a gear-wheel 30, which meshes with a pinion 31, mounted on a drive-shaft 32, by means of which the vessel is rotated.

The vessel is provided with a charging-hole 33, closed by a cap 34, which is secured firmly in place by a screw 35, and is fluid tight by means of a gasket 36. The vessel is also provided with a discharge-pipe 38, controlled by a valve 39, and an orifice 40, in the partition 9, affords communication between the vessel and the chamber 2. The chamber 2, is provided with a valve-controlled discharge-pipe 41.

The inlet-pipe 10, is connected by a wire 42, with the positive pole of a suitable electrical source of supply, (not shown), and the inlet and discharge-pipes 25 and 26, are connected by wires 43 and 44, respectively, with the other or negative pole of said electrical source of supply, each pipe having its inner section suitably insulated from the outer section, as indicated at $a$, $b$, $c$.

As a concrete example of this process and the manner in which it is carried out in combination with the apparatus above described, the formation of ammonia from free nitrogen and hydrogen, through the initiation of mercury or quicksilver will be taken. Mercury is introduced into the vessel 1, through the opening 33, until it reaches approximately a level communicating with the reticulated pipe 27, at which time the opening is closed. The coil 27, is brought into electrical communication with one terminal of a generator, or other source of supply, not shown, and the perforated, reticulated coil 14, is brought into communication with the opposite terminal of said supply. A refrigerating fluid is then caused to circulate through the coil 27, by opening valves 28 and 29, for the purpose of refrigerating and maintaining the mercury, communicating therewith, at a temperature approximately sixty degrees F., or below, $i.$ $e.$, at or below ordinary atmospheric temperature. Nitrogen gas is then supplied through pipe 11, and hydrogen gas through pipe 12, by opening the respective valves 13, said valves being so adjusted, with reference to the gas pressures, that a mixture of nitrogen and hydrogen, in proportion approximately one of the former to four of the latter, by volume, is caused to be forced through the check-valve 22, into the vessel 1, through the perforations 15, at a pressure approximately fifty pounds, which pressure is ascertained by the gage 21.

As the mixture of nitrogen and hydrogen is introduced into vessel 1, the said vessel is caused to revolve rapidly by means of the gearing, thereby causing the mercury therein to be rapidly tumbled, oscillated, and agitated in contact or in communication with the mixture of nitrogen and hydrogen, in such a manner that the frictional or attritional effect thereof causes the nitrogen and hydrogen to combine, and in the presence of an excess of hydrogen, to temporarily unite with the mercury, producing so-called ammonium amalgam; the combining of the nitrogen and hydrogen, in the presence of mercury, being augmented by the action of electricity passing between the coils 27 and 14, in a rapidly interrupted manner, by the action of the falling, dashing, or agitated particles of mercury passing through or between the fixed coils in the revolving vessel 1. The mixture of nitrogen and hydrogen is continually and gradually forced into the revolving vessel in order to maintain a pressure therein of approximately sixty pounds, in order to compensate for the condensation and absorption occurring in said vessel during the formation of ammoniacal substances, and absorption or union of the same with or by the mercury. The nitrogen and hydrogen is supplied to the apparatus in this manner for about three hours, when it is cut off by closing the respective valves 13. The refrigerating fluid is then discharged from the coil 27, by blowing the same out, and said coil is then caused to communicate with a steam-supply, not shown, the heat of which elevates the temperature of the ammonium amalgam, and causes it to decompose or dissociate, liberating ammonia-gas and free hydrogen, which escapes through the opening 40, into the chamber 2, from which it is discharged through the pipe or duct 18 and 16, on opening the valve 17, and from thence conveyed to a suitable reservoir, or absorbing or combining chamber, not shown, and after the separation of the ammonia from the associated hydrogen, the said hydrogen may be recovered in any convenient manner for future use. After exposing the substances in vessel 1, to the action of heat and electricity, during this second stage of the process for about one hour, the larger portion of the available ammonia will be found to have been discharged, at which time the valve 17, is closed, the steam discharged from coil 27, the revolution of the apparatus stopped, and the contents of the vessel 1, cooled by again passing the refrigerating fluid through coil 27. When the temperature of the mercury in vessel 1 has been reduced, by thus cooling, to a temperature approximately sixty degrees F., or below, more nitrogen and hydrogen is introduced by opening valves 13, the vessel 1 revolved and the process continued as before.

It is found advantageous to add to, or amalgamate with the mercury certain substances of so-called contact or catalytic nature, capable of facilitating the union of nitrogen and hydrogen to form or produce ammonia, or transiently ammonium amalgam, such as calcium. By liquefying metal, such as calcium, at ordinary temperatures, having in a heated state an affinity for nitrogen and hydrogen, or both, by the action of fluid solvents or liquefying agents, such as mercury, the affinity of said metal for nitrogen, hydrogen, or both, is induced, under ordinary atmospheric conditions of temperature, without the necessity of heating the same; furthermore, such calcium, or similar substance acts as a so-called catalytic or contact agent in the formation of ammonia from free nitrogen and hydrogen in the presence of an agent of solvent combining or assimilating nature, such as mercury, with which it forms an amalgam, together with hydrogen, and from which it can be finally eliminated by dissociation or decomposing the amalgam by the action of heat.

Such metals as calcium having an affinity, in a heated state, for nitrogen, hydrogen, or both, when liquefied by the action of other substances, at ordinary temperatures, and especially when associated with substances capable of uniting with compounds of nitrogen and hydrogen, such as mercury, in the formation of mercury amalgam, are found to act with superior avidity in the fixation of nitrogen and hydrogen, and formation of compounds or compositions thereof without the assistance of heat from an extraneous or other source than is attained or obtained by the employment of such substances *per se* in a heated state.

In subjecting the substances employed in the formation of ammonia to the action of electricity, I do not desire to confine myself to any particular form or character of electricity, but intend to include any and all character or forms which may be selectively adaptable to any particular case, or the production of any particular product, be it a frictional, pulsating, alternating, polyphase, of high or low tension, or otherwise. Neither do I desire to confine myself to the formation of ammonia, but intend to include and do include the application of the herein described process for the fixation of nitrogen with hydrogen *per se*, or hydrogen compounds, or compositions, be they of ammoniacal, azoical, di-azoical, or other form or character of nitrogen-hydrogen containing compounds, be they simple, compound, complex, or polymeric in nature, or in which the nitrogen may exist in combination at any possible atomicity.

The terms "ammoniacal" and "ammonia" employed herein, with reference to substances capable of uniting therewith, have reference to hydrogen ammonide, or so-called ammonium, ($NH_4$), as well as ammonia *per se*, and the designation of substances associated therewith, with which it will combine, to elements, compounds or compositions, such, for instance, as mercury and hydrogen, as a substance capable of uniting with ammonia, forming mercury-hydrogen ammonide, or ammonium amalgam.

The formation of ammoniacal compounds or compositions, in accordance with this process, may be carried on under reduced, or increased pressure, or both, and by the action of heat or refrigeration and the energy supplied to cause the union of the elements or substances to produce the product desired, may be derived from a source of heat, light, electricity, radio-activity, or other form, without departing from the spirit or scope of my invention.

It should be noted that an atmosphere of hydrogen containing nitrogen enough to form ammonium, is of such low density as to be looked upon, or produce a condition which ordinarily results, when mercury is agitated in rarefied atmosphere, when such mercury is agitated with the lighter gases, such as nitrogen containing hydrogen largely in excess of volume, such as four volumes of hydrogen to one of nitrogen.

Instead of employing mercury, which is fluid at ordinary temperature, as a medium for supplying energy and forming compounds containing nitrogen and hydrogen, I can employ molten metals, such as lead, or alloys of selective melting point, such as fusible metal, without departing from the spirit or scope of my invention.

I have found it of advantage to augment the process of synthetically forming nitrogen-hydrogen-containing compounds from their elements, or substances containing the same in a yielding condition, as hereinbefore described, by exposing the combining or reacting substances to, or associating the same with, water, either as liquid, vapor or steam, or under conditions capable of producing a like state, whereby the formation and union of the nitrogen-hydrogen-containing compound or compounds, in, with, or through the associated combinable fluid, and its dissociation and decomposition, or evolution, is enhanced, and its recovery in a free, or utilizable condition, facilitated. The nitrogen-hydrogen compound thus obtained, in gaseous or other form, can then be secured in the form of suitable salts or compounds by combining the same with suitable acids, solvents, or neutralizing agents, which neutralizing agents may be alkaline in some cases, where the nitrogen-hydrogen-containing compound obtained is of more or less acid character, such as azoic, hydrocyanic acid, etc.

It should be noted, that the agitation of nitrogen and hydrogen with the associated fluids, or other substances as set forth, during the period of supplying energy to the ingredients, for the purpose of causing the combination of nitrogen and hydrogen, results in a fluctuating pressure on, in, and through the ingredients, and on, in, and through the nitrogen and hydrogen being acted upon by the supplied energy, thereby facilitating the union of nitrogen and hydrogen and the formation of ammonia, through the thorough mixing and dividing of the ingredients, resulting in a complete association thereof, together with a greater percentage of conversion, in less time, and with less supplied energy than is required in an ordinary mobile state, or under ordinary and uniform atmospheric pressure; the minute segregation of the particles of the more resistant nitrogen and hydrogen fluids, in and throughout the other fluids associated therewith, reducing the mass resistance to the energy supplied thereby more readily diffusing the supplied energy throughout the same, and also resulting in a more or less energized or electrified condition induced by internal friction of the ingredients agitated, thus augmenting the action of the energy supplied.

Having now described my invention what I claim is:—

1. Process of making ammonia, which comprises supplying energy to nitrogen and hydrogen, while under fluctuating pressure in the presence of a substance capable of uniting with ammonia.

2. Process of making ammonia, which comprises supplying energy to nitrogen and hydrogen, while under fluctuating pressure in the presence of a substance capable of uniting with ammonia, and augmenting the union by the action of a contact substance.

3. Process of making ammonia, which comprises supplying energy to nitrogen and hydrogen, while under other than atmospheric pressure and in the presence of a substance capable of uniting with ammonia.

4. Process of making ammonia, which comprises supplying energy to nitrogen and hydrogen, while under other than atmospheric pressure and in the presence of a substance capable of uniting with ammonia, and augmenting the union by the action of a contact substance.

5. Process of making ammonia, which comprises supplying energy to nitrogen and hydrogen, while in the presence of mercury.

6. Process of making ammonia, which comprises supplying energy to nitrogen and hydrogen, while in the presence of mercury, and augmenting the union by the action of a contact substance.

7. Process of making ammonia, which comprises supplying energy to nitrogen and hydrogen, while under pressure and in the presence of mercury.

8. Process of making ammonia, which comprises supplying energy to nitrogen and hydrogen, while under pressure and in the presence of mercury, and augmenting the union by the action of a contact substance.

9. Process of making ammonia, which comprises supplying energy to nitrogen and hydrogen, while in the presence of a substance capable of uniting with ammonia, and augmenting the union by the action of calcium.

10. Process of making ammonia, which comprises supplying energy to nitrogen and hydrogen, while under pressure and in the presence of a substance capable of uniting with ammonia, and augmenting the union by the action of calcium.

11. Process of making ammonia, which comprises supplying energy to nitrogen and hydrogen, while in the presence of mercury, and augmenting the union by the action of calcium.

12. Process of making ammonia, which comprises supplying energy to nitrogen and hydrogen, while under pressure and in the presence of mercury, and augmenting the union by the action of calcium.

13. Process of making ammonia, or ammonia bases, which comprises agitating mercury with nitrogen and hydrogen.

14. Process of making ammonia, or ammonia bases, which comprises agitating mercury with nitrogen and hydrogen, and augmenting the union by the action of a contact substance.

15. Process of making ammonia, or ammonia bases, which comprises agitating mercury with nitrogen and hydrogen, while under pressure.

16. Process of making ammonia, or ammonia bases, which comprises agitating mercury with nitrogen and hydrogen, while under pressure, and augmenting the union by the action of a contact substance.

17. Process of making ammonia, which comprises supplying energy to nitrogen and hydrogen, while under fluctuating pressure in the presence of a substance capable of uniting with ammonia, and augmenting the union by the action of electricity.

18. Process of making ammonia, which comprises supplying energy to nitrogen and hydrogen, while under fluctuating pressure in the presence of a substance capable of uniting with ammonia, and augmenting the union by the action of a contact substance and electricity.

19. Process of making ammonia, which comprises supplying energy to nitrogen and hydrogen, while under other than atmospheric pressure and in the presence of a substance capable of uniting with ammonia and augmenting the union by the action of electricity.

20. Process of making ammonia, which comprises supplying energy to nitrogen and hydrogen, while under other than atmospheric pressure and in the presence of a substance capable of uniting with ammonia, and augmenting the union by the action of a contact substance and electricity.

21. Process of making ammonia, which comprises agitating substances capable of yielding nitrogen and hydrogen, while under pressure and in the presence of a substance capable of uniting with ammonia, and augmenting the union by the action of electricity.

22. Process of making ammonia, which comprises agitating substances capable of yielding nitrogen and hydrogen, while under pressure and in the presence of a substance capable of uniting with ammonia, and augmenting the union by the action of a contact substance and electricity.

23. Process of making ammonia, or ammonia bases, which comprises supplying energy to substances containing nitrogen and hydrogen, in a yielding state, while in the presence of mercury, and augmenting the union by the action of electricity.

24. Process of making ammonia, or ammonia bases, which comprises supplying energy to substances containing nitrogen and hydrogen, in a yielding state, while in the presence of mercury, and augmenting the union by the action of a contact substance and electricity.

25. Process of making ammonia, or ammonia bases, which comprises supplying energy to substances containing nitrogen and hydrogen, in a yielding state, while under pressure and in the presence of mercury, and augmenting the union by the action of electricity.

26. Process of making ammonia, or ammonia bases, which comprises supplying energy to substances containing nitrogen and hydrogen, in a yielding state, while under pressure and in the presence of mercury, and augmenting the union by the action of a contact substance and electricity.

27. Process of making ammonia, which comprises supplying energy to nitrogen and hydrogen, while in the presence of mercury, and augmenting the union by the action of electricity.

28. Process of making ammonia, which comprises supplying energy to nitrogen and hydrogen, while in the presence of mercury, and augmenting the union by the action of a contact substance and electricity.

29. Process of making ammonia, which comprises supplying energy to nitrogen and hydrogen, while under pressure and in the presence of mercury, and augmenting the union by the action of electricity.

30. Process of making ammonia, which comprises supplying energy to nitrogen and hydrogen, while under pressure and in the presence of mercury, and augmenting the union by the action of a contact substance and electricity.

31. Process of making ammonia, which comprises supplying energy to nitrogen and hydrogen, while in the presence of a substance capable of uniting with ammonia, and augmenting the union by the action of calcium and electricity.

32. Process of making ammonia, which comprises supplying energy to nitrogen and hydrogen, while under pressure and in the presence of a substance capable of uniting with ammonia, and augmenting the union by the action of calcium and electricity.

33. Process of making ammonia, which comprises supplying energy to nitrogen and hydrogen, while in the presence of mercury, and augmenting the union by the action of calcium and electricity.

34. Process of making ammonia, which comprises supplying energy to nitrogen and hydrogen, while under pressure and in the presence of mercury, and augmenting the union by the action of calcium and electricity.

35. Process of making ammonia, or ammonia bases, which comprises agitating mercury with nitrogen and hydrogen, and augmenting the union by the action of electricity.

36. Process of making ammonia, or ammonia bases, which comprises agitating mercury with nitrogen and hydrogen, and augmenting the union by the action of a contact substance and electricity.

37. Process of making ammonia, or ammonia bases, which comprises agitating mercury with nitrogen and hydrogen, while under pressure, and augmenting the union by the action of electricity.

38. Process of making ammonia, or ammonia bases, which comprises agitating mercury with nitrogen and hydrogen, while under pressure, and augmenting the union by the action of a contact substance and electricity.

In testimony whereof I affix my signature in presence of two witnesses.

HENRY SPENCER BLACKMORE.

Witnesses:
H. N. JENKINS,
F. A. MILLIGAN.